United States Patent
Kluge et al.

(10) Patent No.: US 11,941,564 B2
(45) Date of Patent: Mar. 26, 2024

(54) EVENT MONITORING WITH SUPPORT SYSTEM INTEGRATION

(71) Applicant: NCR Voyix Corporation, Atlanta, GA (US)

(72) Inventors: Thomas Kluge, Amsterdam (NL); Izham Ismail, Petaling Jaya (MY); Thomas Alfred McQuinlan, Corinella (AU); Gwendelyn Maglasang Lorzano, Seri Kembangan (MY); Sanjeev Kumar Singh, Johns Creek, GA (US)

(73) Assignee: NCR Voyix Corporation, Atlanta, GA (US)

( * ) Notice: Subject to any disclaimer, the term of this patent is extended or adjusted under 35 U.S.C. 154(b) by 98 days.

(21) Appl. No.: 17/104,236

(22) Filed: Nov. 25, 2020

(65) Prior Publication Data

US 2022/0164733 A1    May 26, 2022

(51) Int. Cl.
  *G06Q 10/06* (2023.01)
  *G06Q 10/0637* (2023.01)
  *G06Q 30/0283* (2023.01)

(52) U.S. Cl.
  CPC ..... *G06Q 10/0637* (2013.01); *G06Q 30/0283* (2013.01)

(58) Field of Classification Search
  None
  See application file for complete search history.

(56) References Cited

U.S. PATENT DOCUMENTS

| | | | | |
|---|---|---|---|---|
| 2016/0217447 | A1* | 7/2016 | Sarkar | G06Q 30/0283 |
| 2018/0108022 | A1* | 4/2018 | Bandera | G06Q 10/06316 |
| 2019/0228361 | A1* | 7/2019 | Prime | G06Q 10/06315 |

OTHER PUBLICATIONS

EP Search Report.

* cited by examiner

*Primary Examiner* — Arif Ullah
(74) *Attorney, Agent, or Firm* — Schwegman Lundberg & Woessner, P.A.

(57) ABSTRACT

A site server agent monitors a site server for an event associated with an update process that spans multiple resources associated with multiple systems. The agent hands the monitoring off to a remote connected systems manager when a state associated with the event does not change to an expected value within a configured period of time or based on a configured condition. Connected systems manager continues to monitor the state and elevates the event to a level two incident after a second configured period of time or based on a second configured condition. When the state has still not changed after a third configured period of time or based on a third configured condition, a level one incident is generated in an incident management system associated with the site for support staff to immediately investigate the update process and resources of the systems.

12 Claims, 4 Drawing Sheets

EVENT MONITORING WITH SUPPORT SYSTEM INTEGRATION

BACKGROUND

Many enterprises have native support systems that monitor events but typically these systems fail to produce sufficient audit trails, are late to engage the necessary level of support when events warrant, and/or inappropriately engage support staff before subsequent events reveal that a problem event was resolved. This can cause inefficient use of support staff and regulatory compliance issues for the enterprises.

Convenience and fuel retailers are particularly affected by failures in their support systems to adequately monitor and audit fuel price update events. These events span multiple internal systems for the site, the terminal, the fuel controller, and pricing board (digital signs, etc.). It is critical to ensure the price update happens timely to ensure regulatory and industry standards compliance. Failures in the price update process can prevent fuel sales in stores, loss of revenue for retailers, and brand damage.

Fuel price update failures can be due to multitude of issues on the different system components including fuel price change issues and fuel authorization issues. Monitoring of the price change and timely resolution of issues are critical to ensure proper operation of the fuel retail business.

Oftentimes, support systems are not alerted when a price update is not timely updated, resulting in substantial loss of revenues for the retail store. Further, when support systems are alerted, the price update may have already been resolved and properly updated throughout the retailer's systems, such that support staff is engaged when the staff is no longer needed. Additionally, because the price update involves multiple systems, the audit trails (assuming they exist) are incomplete and/or inaccurate with respect to the actions taken and time needed to fully complete the price update throughout the systems of the retailer. Also, any available audit trail may have to be pieced together from each of the systems.

SUMMARY

In various embodiments, methods and a system for event monitoring and support system integration are provided.

According to an embodiment, a method for event monitoring and support system integration is presented. An event is received from an agent monitoring an update process associated with the event on a site server. A log is monitored on the site server for a change in state of the update process based on a first condition. An incident with a first severity level is generated when the change is not detected based on the first condition. The log on the site server is monitored for the change in the state of the update process based on a second condition. A site incident management system is interacted with to generate a second incident with a second severity level within the site incident management system when the change is still not detected based on the second condition.

DETAILED DESCRIPTION

Figure 1A:
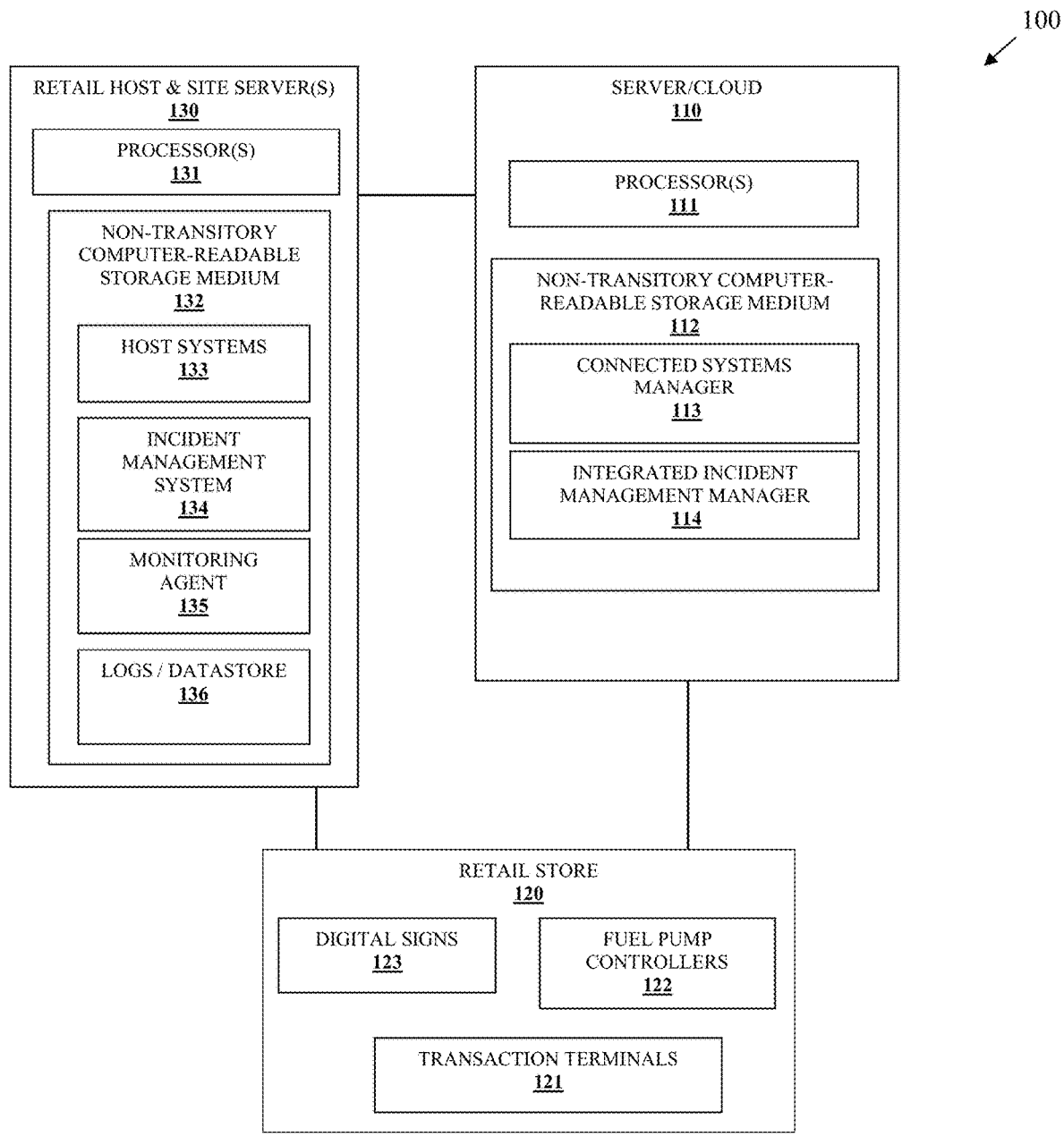
FIG. 1A is a diagram of a system for event monitoring and support system integration, according to an example embodiment.

FIG. 1A is a diagram of a system 100 for event monitoring and support system integration, according to an example embodiment. It is to be noted that the components are shown schematically in greatly simplified form, with only those components relevant to understanding of the embodiments being illustrated.

Furthermore, the various components (that are identified in the FIG. 1) are illustrated and the arrangement of the components is presented for purposes of illustration only. It is to be noted that other arrangements with more or with less components are possible without departing from the teachings of event monitoring and support system integration, presented herein and below.

As will be demonstrated more clearly herein and below, system 100 proactively monitors an event that is associated with updating resource information across multiple interconnected systems. This is done by monitoring resource information relevant to a detected event for expected changes (updates) until the resource information spanning the interconnected systems reaches a point for which level three or (highest level) of support is needed or until it is detected that the update associated with the event for the multiple resource information has been updated. When the update precipitated by the event is not progressing as it should be during the update processing with the interconnected systems, the appropriate level of support is notified and when the update does not complete when it expected to complete, a level three or a highest level of support ticket is automatically generated in a retailer's native incident management system. An audit of the monitoring is maintained.

It is to be noted that system 100 can be processed with a variety of different retail environments for a variety of different purposes. For purposes of illustrating a particular application of system 100, system 100 is described for monitoring an update of a fuel price within a convenience fuel retail environment. Again, it is noted other applications of system 100 are foreseeable for events that require tracking or that precipitate downstream processing that spans multiple interconnected systems of a retailer.

System 100 includes a server/cloud 110, a retail store, 120, and retail host and site servers 130.

Server/cloud 110 comprises at least one processor 111 and a non-transitory computer-readable storage medium 112. Medium 112 comprises executable instructions representing connected systems manager 113, and an integrated incident management manager 114. Executable instructions when executed by processor 111 from medium 112 cause processor 111 to perform the processing discussed herein and below with respect to 113-114.

Retail store 120 comprises transaction terminals 121, fuel pump controllers 122, and, optionally, digital signs 123. Each of these devices comprises processors and executable instructions for interacting with retail host and site servers 130 and, in some instances, server/cloud 110.

Retail host and site servers 130 may comprise a plurality of servers 130 for a given retailer; for instance, there may be one or more host or backend servers 130 and a plurality of site servers 130 (each site having its own server 130).

Servers 130 comprise processors 131 and non-transitory computer-readable storage mediums 132. Mediums 132 comprise executable instructions for interconnected host systems 133 of the retailer, an incident management system 134 and a monitoring agent 135. Executable instructions when executed by processors 131 from mediums 132 cause processors 131 to perform processing operations discussed herein and below with respect to 133-135. Mediums 132 also comprise a plurality of logs/datastores 136.

It is to be noted that monitoring agent 135 may be replicated as an executable instances on each site server 130 associated with retail servers 130, such that an instance of agent 135 performs processing (as discussed herein and below) for a given site (such as retail store 120) and a different instance performs processing for a different site.

Host systems 133 perform a variety of operations and services for a retailer, such a fuel controller management, site management, terminal management, digital sign management, resource management, transaction processing, inventory management, etc. Each system 133 is configured to raise a variety of events associated with an activity or associated with a status condition of a given asset.

Monitoring agent 135 is configured to identify and monitor expected activities associated with a preconfigured event raised by one or more of the systems 133. The preconfigured event for purposes of the convenience retail fuel environment illustration with FIG. 1A, is an event that is generated when a change in price for a fuel grade or changes in prices for multiple fuel grades is raised. Agent 135 is also configured to look for the preconfigured event in a specific manner, such as via a particular log or audit file 136.

In an embodiment, monitor agent 135 may dynamically interpret a predefined configuration file that defines the event to be monitored and defines a location or manner by which the event can be detected. Still further monitor agent 135 configures, via the configuration file, to perform a preconfigured process flow that monitors state changes posted by the relevant systems 133 that require updates because of the price change event.

In this way, agent 135 may be implemented as a generic source code that processes the configuration file for performing custom event monitoring and reporting back to connected systems manager 113 at an appropriate processing point defined within the conditional configured process flow of the configuration file.

When agent 135 identifies a condition that needs to be reported to connected systems manager 113, the event information for the event is sent over a network connection to connected systems manager 113. The event and event information may also be posted to a dashboard or to a support console by connected systems manager 113. Assuming the resource information is updated properly within the predefined timeframes or based on the predefined conditions, the monitoring ends. However, if such is not the case, then integrated incident management manager 114 interacts with the retailer's incident management system 134 to create a level 3 or a highest level of support ticket for the event.

Figure 1B:
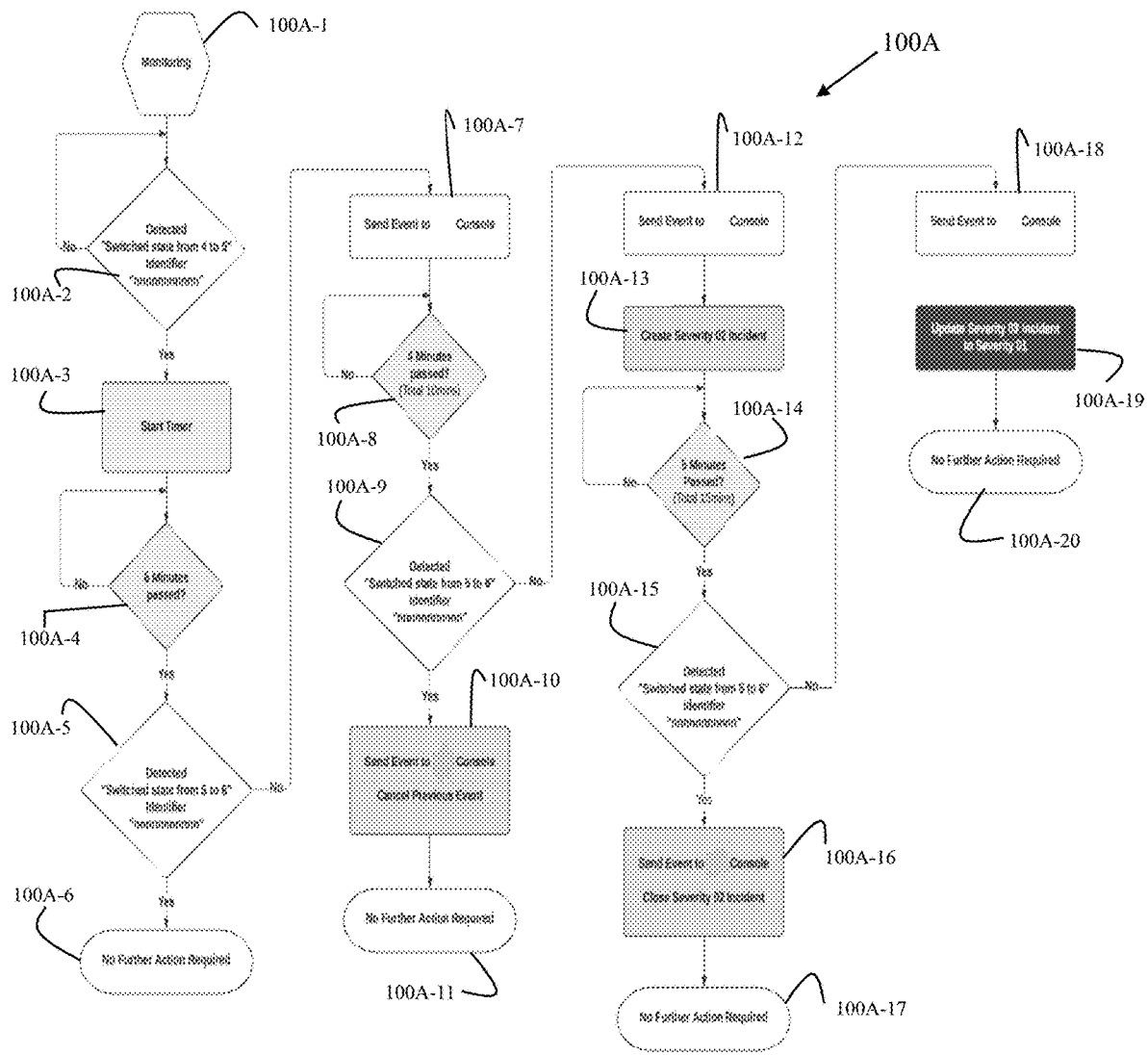
FIG. 1B is a diagram of a method for event monitoring and support system integration, according to an example embodiment.

A more detailed process flow for system 100A is shown in FIG. 1B along with specific preconfigured timeframes and conditions. It is noted that these preconfigured timeframes and/or preconfigured conditions can be provided as parameter values that are evaluated by both agent 135 and connected systems manager 113.

At 100A-1 the agent 135 is initiated on the a retailer's site server 130 for store 120 for purposes of monitoring the updating of resource information associated with a price fuel change instituted by the retailer for store 120.

Agent 135 monitors a specific file or for a creation of a specific file/log/datastore 136 within a specific location on site server 130 that is indicative of a price change event being raised for the store 120. At 100A-2, if no change is detected, the monitoring for the a price change event continues in a loop on site server 130. For example, at 100A-2, agent 135 looks for a price state (event information) that switched from a value unchanged to a value of update posted (shown in FIG. 1B as an unchanged value being represented by a numeric value of 4 to a update posted value being represented by a numeric value of 5). The price change event is associated with a unique identifier (the string of n's represents a unique price change event identifier in FIG. 1B.

If agent 135 detects a state change switched from 4 to 5 for the event information from log 136, at 100A-2, agent 135, at 100A-3 sets a timer for a preconfigured amount of time (6 minutes in FIG. 1B). As long as the timer has not expired, agent 135 idles, at 100A-4. When the time expires, at 100A-5, agent 135 checks to see if the event information has switched from a state value of update posted to a state value of update executed (shown in FIG. 1B as numeric value 5 (for the updated posted value) to numeric value 6 (for updated executed value)). Assuming this is the case, agent 135 ends at 100A-6. This is an indication that resource information was updated within the host systems 133 for the price change event and nothing further is needed.

However, if the state (event information) did not change from 5 to 6 at 100A-5, agent 135 sends the event identifier and event information, at 100A-7 to connected systems manager 113, which may also cause a dashboard or a console to be updated with the event identifier and event information.

Connected systems manager 113, at 100A-8, sets a timer (4 minutes—but again this is a configured time period or a configured condition). Connected systems manager 113 loops or idles until the timer expires and then, at 100A-9, rechecks to see if the state (event information) has changed from 5 to 6 using the price change event identifier to uniquely identify the price change event. Moreover, the event information (state) value being checked is again obtained from the corresponding log 136 (same log 136 that agent 135 was monitoring).

Assuming the state changed from 5 to 6, at 100A-10, connected systems manager 113 sends the price change event to a dashboard or console and cancels the event. At 100A-11, no further action is needed for the price change event as all resource information for the resources associated with the host systems 133 were updated properly based on the event.

Assuming the state change did not move from 5 to 6, at 100A-10, connected systems manager 113 sends, at 100A-12, the event and event information to the console or dashboard. At 100A-13, connected systems manager 113 creates or generates a severity 2 (next level of severity from what was raised at 100A-7) ticket or incident. Next, at 100A-14, connected systems manager 113 sets a time for 5 minutes. At 100A-15 and after the 5 minutes has passed, connected systems manager 113 checks again to see if the state or event information has changed within log 136 from 5 to 6. If this is the case, at 100A-16, connected systems manager 113 sends the event and event information to the console and closes the severity level 2 incident or ticket. At 100A-17, connected systems manager 113 stops monitoring the event as all resource information for the resources associated with host systems 133 were updated properly based on the event.

However, if the state information does not change from 5 to 6 as expected, at 100A-18, connected systems manager 113 sends the event and event information to the console or dashboard. This causes integrated incident management manager 114, at 100A-19, to update severity of the level 2 incident to a level 1 incident in the retailer's incident management system 134 (which will automatically notify support staff to address the price change event because not all resource information for the resources of the host systems are showing an update with the price change that was associated with the price change event. Once the level 1 incident is sent to the retailer's incident management system 134, no further monitoring is needed for the event and event monitoring concludes at 100A-20.

In an embodiment, both agent 135 and connected systems manager 135 may monitor more than one log/datastore 136 for state changes that reflect updated resource information for the resources that span the host systems 133. That is, each individual system may write updates to their resources in different logs/data stores 136; rather than a same log/datastore 136. In this embodiment, the event identifier for the price change event is the same across the different logs/data stores 136 or can be uniquely identified across the different logs/data stores.

In an embodiment, the resource information reflects a status or a condition of a resource. The status is a current fuel price being reported by the resource and the resource may include the fuel pump controllers 122, the digital signs 123, and transaction terminals 121. The event information is a value indicating that the resource information was updated/changed (changed from posted to executed/updated) for a given resource.

In an embodiment, both agent 135 and connected systems manager 113 maintains a separate audit trail comprising the event identifier, noted event information, and time stamps during the monitoring shown in FIG. 1B. This audit tail may be used to demonstrate compliance with a fuel price change being properly updated in a timely fashion or to demonstrate that the price was not updated in a timely fashion.

Method 100A provides monitoring of the fuel price update via a software agent 135 deployed on the retailer server site 130 that continuously monitors for the trigger or initiating during a fuel price update process based on a presence of a fuel price change event within log 136. The monitoring is done for price update for each fuel grade. The agent 135 monitors state changes from the point the change is initiated (posted) to the point it completes successfully (executed). In case the state change does not happen (does not move from posted to executed) within a configured time period, the agent 135 detects that as abnormal condition and raises an event and submits to connected systems manager 113 for further monitoring of the condition. If the state change continues to indicate problem, connected systems manager 113 escalates the event as an incident for service desk attention. The agent 113 continues to monitor the price update process to detect if the condition has cleared and resolves the event automatically. However, if the price update does not complete within acceptable time then the severity of the incident is updated for manual intervention by the service desk person associated with the retailer via the retailer's incident management system 134. The service desk person can then troubleshoot and resolve issue remotely or through working with a store 120 associate to resolve.

A summary of method 100A is as follows. Agent 135 detects a posted fuel price change event in log 136 of site server 120, the initial event information or state is set to Posted. If the event information or state does not change within log 136 to executed within a first configured of time of 6 minutes, agent 135 generates an event for the event and sends it to the connected systems manager 113. Connected systems manager 113 waits for a second configured period of time of 4 minutes (10 minutes of elapsed time). If the event state has not changed from posted to executed, connected systems manager 113 generates a level 2 severity incident and sends to a support console. A third period of time is given by connected systems manager 113 of 5 minutes, if still not event state change to executed, connected systems manager 113 interacts with the retailer's incident management system 134 to generate a severity 1 incident or ticket. This causes support staff of the retailer to address the issue immediately either on store 120 or remotely via staff on store 120.

These and other embodiments are now discussed with reference to FIGS. 2-3.

Figure 2:
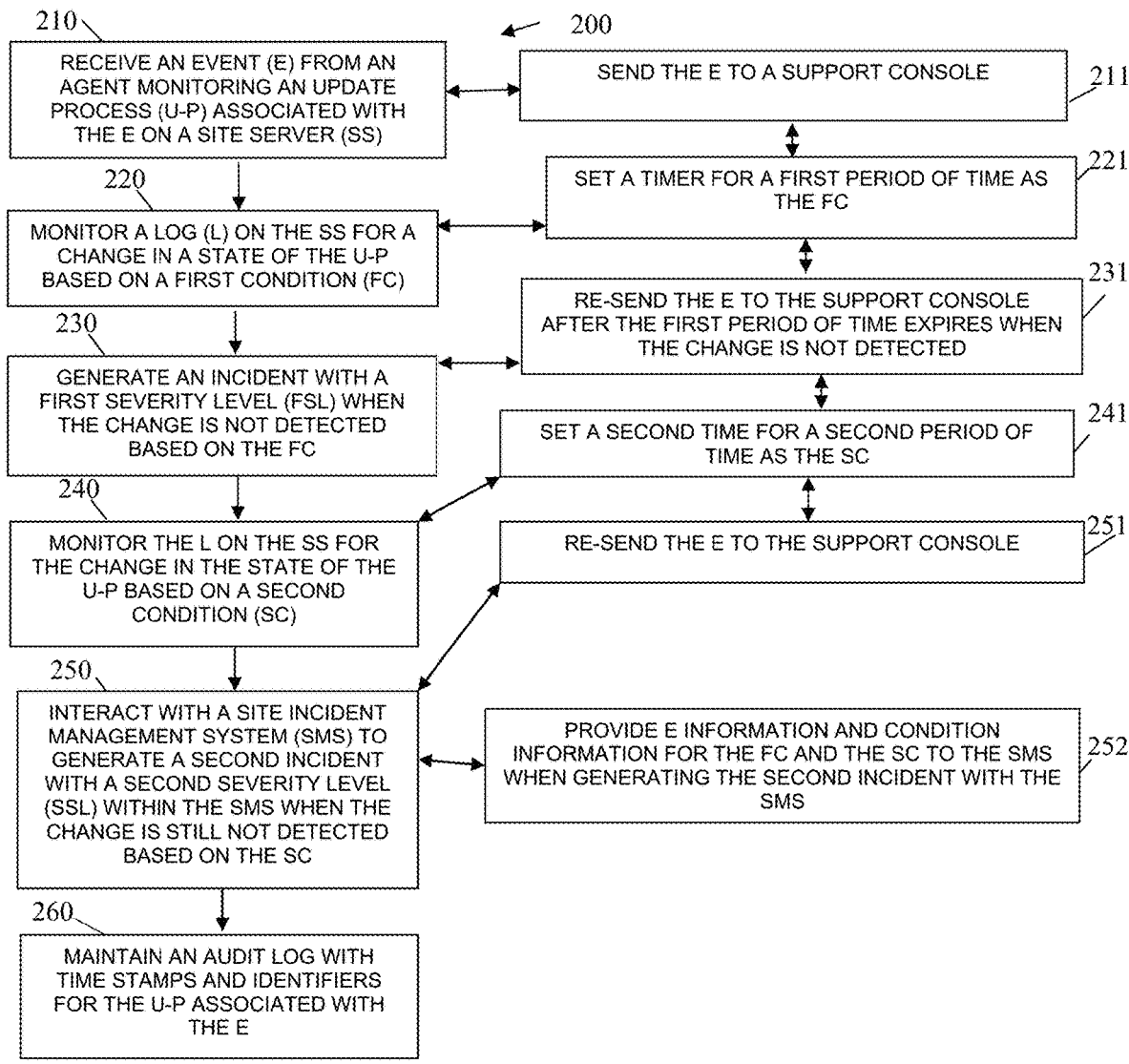
FIG. 2 is a diagram of another method for event monitoring and support system integration, according to an example embodiment.

FIG. 2 is a diagram of a method 200 for event monitoring and support system integration, according to an example embodiment. The software module(s) that implements the method 200 is referred to as an "event update process monitor." The event update process monitor is implemented as executable instructions programmed and residing within memory and/or a non-transitory computer-readable (processor-readable) storage medium and executed by one or more processors of a device. The processor(s) of the device that executes the event update process monitor are specifically configured and programmed to process the event update process monitor. The event update process monitor may have access to one or more network connections during its processing. The network connections can be wired, wireless, or a combination of wired and wireless.

In an embodiment, the device that executes the event update process monitor is server 120. In an embodiment, the server 120 is a cloud-based processing environment comprising a collection of physical servers cooperating as a single logical server (a cloud 120).

In an embodiment, the event update process monitor is all or some combination of the connected systems manager 113 and integrated incident management manager 114.

At 210, the event update process monitor receives an event from an agent that is monitoring an update process associated with the event on a site server.

In an embodiment, at 211, the event update process monitor sends the event to a support console or a dashboard.

At 220, the event update process monitor monitors a log on the site server for a change in a state of the update process based on a first condition.

In an embodiment of 211 and 220, at 221, the event update process monitor sets a time for a first period of time as the first condition.

At 230, the event update process monitor generates an incident with a first severity level when the change is not detected based on the first condition.

In an embodiment of 221 and 230, at 231, the event update process monitor re-sends the event to the support console and/or dashboard after the first period of time expires when the change is still not detected.

At 240, the event update process monitor monitors the log on the site server for the change in the state of the update process based on a second condition.

In an embodiment of 231 and 240, at 241, the event update process monitor sets a second time for a second period of time as the second condition.

At 250, the event update process monitor interacts with a site incident management system to generate a second incident with a second severity level within the site incident management system when the change in the update process is still not detected based on the second condition.

In an embodiment of 241 and 250, at 251, the event update process monitor re-sends the event to the support console.

In an embodiment, at 252, the event update process monitor provides event information and condition information for the first condition and the second condition to the site incident management system when generating the second incident with the site incident management system.

In an embodiment, at 260, the event update process monitor maintains an audit log with time stamps and identifiers for the update process associated with the event.

Figure 3:
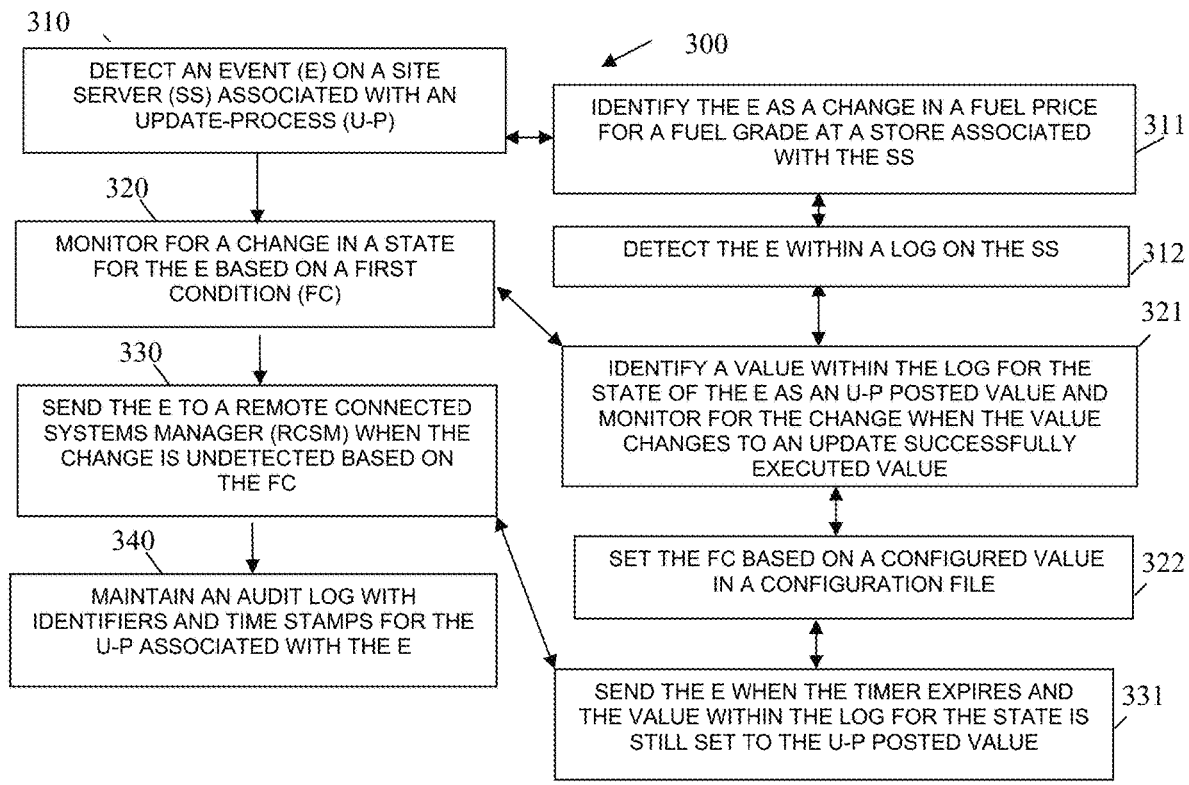
FIG. 3 is a diagram of yet another method for event monitoring and support system integration, according to an example embodiment.

FIG. 3 is a diagram of another method 300 for event monitoring and support system integration according to an example embodiment. The software module(s) that implements the method 300 is referred to as an "event update process monitoring agent." The event update process monitoring agent is implemented as executable instructions programmed and residing within memory and/or a non-transitory computer-readable (processor-readable) storage medium and executed by one or more processors of a device. The processors that execute the event update process monitoring agent are specifically configured and programmed to process the event update process monitoring agent. The event update process monitoring agent may have access to one or more network connections during its processing. The network connections can be wired, wireless, or a combination of wired and wireless.

In an embodiment, the device that execute the event update process monitoring agent 135 is a retail site server 130. In an embodiment, the site server 130 is a site server 130 for store 120.

In an embodiment, the event update process monitoring agent is monitoring agent 135.

The event update process monitoring agent interacts with method 200 of FIG. 2.

At 310, the event update process monitoring agent detects an event on a site server associated with an update process. The event may be detected based on a change in state for the event within a log file, such as an update-process initiated or posted as a state change for a price change event within the log file.

In an embodiment, at 311, the event update process monitoring agent identifies the event as a change in a fuel price for a fuel grade at a store associated with the site server.

In an embodiment, at 312, the event update process monitoring agent detects the event within a log on the site server.

At 320, the event update process monitoring agent monitors for a change in a state for the event based on a first condition.

In an embodiment of 312 and 320, at 321, the event update process monitoring agent identifies a value within the log for the state of the event as a fuel update-process posted value and monitors for the change when the value changes to an update successfully executed value.

In an embodiment of 321 and at 322, the event update process monitoring agent sets the first condition value based on a configured value in a configuration file or based on a processing environmental value or parameter passed at run time to the event update process monitoring agent.

At 330, the event update process monitoring agent sends the event to a remote connected systems manager when the change is undetected based on the first condition.

In an embodiment of 322 and 330, at 331, the event update process monitoring agent sends the event when the timer expires and the value within the log for the state is still set to the update-process posted value.

In an embodiment, at 340, the event update process monitoring agent maintains an audit log with identifiers and time stamps for the update process associated with the event.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A method, comprising:
receiving, by a processor of a cloud processing environment, a first condition as a first processing parameter and a second condition as a second processing parameter;
initiating an agent on a site sever associated with a host system, providing the agent a predefined configuration file causing the agent being executed by a site server processor of the site server to perform operations comprising monitoring for an event at a predefined location on the site server, dynamically interpreting the predefined configuration file, identifying the event from the predefined location on the site server based on the dynamically interpreting, monitoring an update process associated with the event based on the dynamically interpreting, and sending the event to the processor of the cloud processing environment;
receiving, by the processor, the event from the agent;
monitoring, by the processor, a log on the site server for a change in a state of the update process based on the first condition;
generating, by the processor, an incident with a first severity level when the change is not detected based on the first condition;
monitoring, by the processor, the log on the site server for the change in the state of the update process based on the second condition;
interacting, by the processor, with a site incident management system of the site server causing the site management system to generate a second incident with a second severity level within the site incident management system when the change is still not detected based on the second condition; and updating, by the processor, a dashboard interface of the host system with an event identifier for the event and event information for the event, wherein the host system performs resource management operations for the site server.

2. The method of claim 1 further comprising, maintaining, by the processor, an audit log with time stamps and identifiers for the update process associated with the event.

3. The method of claim 1, wherein receiving further includes sending the event to a support console.

4. The method of claim 1, wherein monitoring the change based on the first condition further includes setting a timer for a first period of time as the first condition.

5. The method of claim 4, wherein generating further includes re-sending the event to the support console after the first period of time expires when the change is not detected.

6. The method of claim 5, wherein monitoring the change based on the second condition further includes setting a second timer for the second period of time as the second condition.

7. The method of claim 6, wherein interacting further includes re-sending the event to the support console.

8. The method of claim 1, wherein interacting further includes providing the event identifier, the event information, and condition information for the first condition and the second condition to the site incident management system when generating the second incident with the site incident management system.

9. A system comprising:
a first server comprising a first processor and first non-transitory computer-readable storage medium;
the first non-transitory computer-readable storage medium comprising a first set of executable instructions;
a second server comprising a second processor and a second non-transitory computer-readable storage medium, wherein the second server is a cloud processing environment;
the second non-transitory computer-readable storage medium comprising a second set of executable instructions;
the first set of executable instructions when executed by the first processor from the first non-transitory computer-readable storage medium cause the first processor to perform first operations comprising:
obtaining a predefined configuration file;
dynamically interpreting the predefined configuration file and obtaining a definition for an event, a predefined location on the first server for detecting the event, and a first period of time associated with a state;
determining the event is associated with an update process in a log on the first server based on the predefined location of the predefined configuration file;
setting a timer for the first period of time;
checking the state associated with the event in the log for a change to an expected value associated with the update process successfully executing on the first server; and sending the event to the second set of executable instructions when the state does not change;
the second set of executable instructions when executed by the second processor from the second non-transitory computer-readable storage medium cause the second processor to perform second operations comprising:
receiving a second period of time as a first processing parameter and a third period of time as a second processing parameter;
initiating the first set of executable instructions on the first server and providing the predefined configuration file to the first set of executable instructions causing the first set of executable instructions to perform the first operations;
receiving the event from the first set of executable instructions;
setting a second timer for the second period of time;
checking the state in the log on the first server for the change;
when the state has does not reflect the change, setting a third timer for the third period of time;
checking the state in the log on the first server for the change;
when the state does not reflect the change, interacting with an incident management system associated with a host system of the first server causing the incident management system to generate an incident with a severity level that initiates support staff to investigate the update process
updating a dashboard interface of the host system with an event identifier for the event and event information for the event, wherein the host system performs resource management operations for the first server.

10. The method of claim 9, wherein the first set of executable instructions corresponding with the detecting when executed by the first processor from the first non-transitory computer-readable storage medium further cause the first processor to perform additional first operations comprising:
detecting the event based on an initial value associated with the state being switched to a different value.

11. The method of claim 10, wherein the second set of executable instructions corresponding with the receiving when executed by the second processor from the second non-transitory computer-readable storage medium further cause the second processor to perform additional second operations comprising:
sending the event to a support console.

12. The system of claim 11, wherein the second set of executable instructions when executed by the second processor from the second non-transitory computer-readable storage medium further cause the second processor to perform additional second operations comprising:
re-sending the event to the support console after the second timer when the change remains undetected; and
re-sending the event to the support console after the third timer when the change remains undetected.

* * * * *